June 25, 1963     E. K. PIERCE, JR     3,095,110
CLOSURE MEANS
Filed June 1, 1960     3 Sheets-Sheet 1
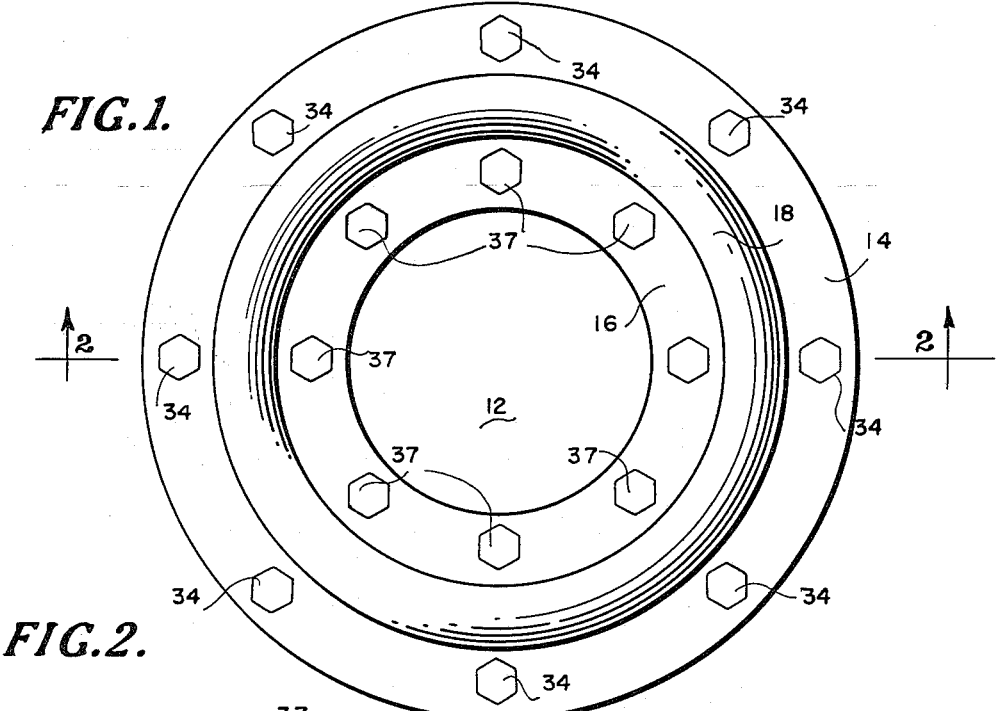
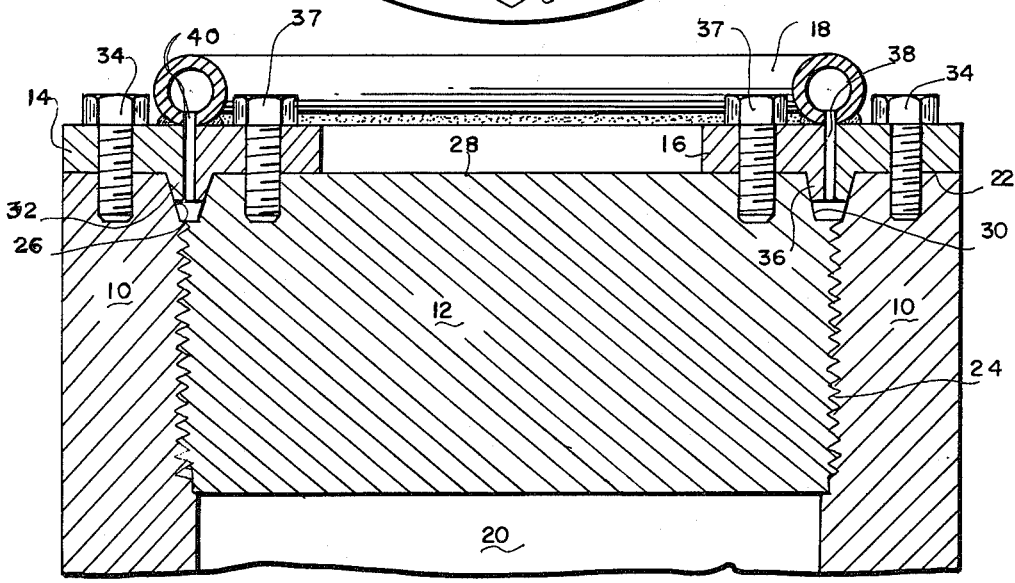
INVENTOR
ELWOOD K. PIERCE, JR.

INVENTOR
ELWOOD K. PIERCE, JR.

BY *Cushman, Darby + Cushman*
ATTORNEYS

June 25, 1963  E. K. PIERCE, JR  3,095,110
CLOSURE MEANS
Filed June 1, 1960  3 Sheets-Sheet 3

INVENTOR
ELWOOD K. PIERCE, JR.

BY Cushman, Darby + Cushman
ATTORNEYS

United States Patent Office 3,095,110
Patented June 25, 1963

3,095,110
CLOSURE MEANS
Elwood K. Pierce, Jr., Houston, Tex., assignor to Gray Tool Company, Houston, Tex., a corporation of Texas
Filed June 1, 1960, Ser. No. 33,212
15 Claims. (Cl. 220—46)

The present invention relates to closure means for sealing openings in high pressure equipment, and more particularly to removable closure means provided with a sealing means capable of withstanding extremely high pressures, as well as lower pressures, said closure means being so designed as to reduce the area of said sealing means subject to such pressures to a minimum.

The invention relates generally to the application of the sealing principles set forth in Letters Patent, Numbers 2,766,829, 2,766,998 and 2,766,999, to a closure means for sealingly closing an opening in a high pressure casing, or the like.

As will be more clearly set forth hereinafter, the closure means embodying the principles of the present invention is adapted to be utilized in any application where it is desired to close and seal an opening in a high pressure casing, or the like, to prevent the leakage of high pressure fluid in the casing through the opening. The casing may be a conduit, wherein it is desired to close and seal one end, or it may be a pressure vessel, wherein it is desired to close and seal an open end of the vessel. The invention is capable of application to both large and small openings, but has particular utility with respect to the sealing of large diameter openings.

As is well known in the art there are many problems which arise when it is desired to seal a relatively large diameter opening in a high pressure casing, or the like, such as those encountered in conventional oil well equipment. Threaded plugs alone, while satisfactory in some applications, are not satisfactory in applications where extremely high pressure is present, since it is usually only a matter of time before fluid begins to leak past the threads. Furthermore, seals requiring the use of conventional gasket material, such as rubber and the like, are not suitable for use at very high temperatures and/or pressures, and applications wherein there exists a corrosive atmosphere or the presence of fluids which will penetrate or deteriorate these gasket materials. In addition, such seals, when used in critical applications, often are incapable of maintaining an effective sealing relationship due to distortion in the sealing elements caused by widely fluctuating temperatures and/or pressures of large magnitudes. These problems are even amplified in applications where it is impossible to periodically inspect and maintain such seals, as for example when used in conjunction with nuclear reactors where much of the equipment is inaccessible and where the leakage of radioactive material is intolerable, such as with high temperature gas cooled nuclear reactors wherein the fluids to be sealed may consist of high temperature hydrogen and/or helium.

It is therefore a primary object of the present invention to provide removable closure means of unusual versatility which will effectively seal an opening in a high pressure casing, almost regardless of the size of the opening, against the leakage of high pressure fluid therethrough, which means is capable of withstanding extremely high pressures for an indefinite length of time.

It is another object of the present invention to provide closure means comprising load-bearing means adapted to be tightly secured in the opening to be sealed for receiving and withstanding the main hydrostatic pressure load against the closure means, and sealing means associated therewith which is subjected to the high pressure within the casing across only a very small area.

It is yet a further object of the present invention to provide closure means comprising load-bearing means adapted to be tightly secured in the opening to be sealed, and sealing means for preventing the leakage of high pressure fluid around said load-bearing means, said sealing means being adapted to satisfactorily seal said opening without requiring the accurate positioning of said load-bearing means in said opening.

It is a further object of the present invention to provide closure means of simple and inexpensive design which is adapted to be quickly and conveniently secured in place, or removed therefrom, and which does not require the use of gaskets, nor accurate pre-positioning before being securely fastened in place.

It is yet another object of the present invention to provide closure means having a flexible sealing element adapted to achieve and maintain an effective seal by means of the stored energy within the sealing element resulting from its deflection when it is in sealing engagement, the deflection of the sealing element being within the elastic limit of the material of which it is made.

It is a further object of the present invention to provide closure means comprising sealing means capable of sealing relatively large diameter openings against extremely high pressures, and equally effective without modification or change for sealing against lower pressures, which sealing means creates a seal which may be effected by the application of only moderate force.

It is yet another object of the present invention to provide closure means comprising a sealing means having a sealing element, the sealing element being completely protected by positive stop means so as to preclude the application of excessive force thereagainst which might damage or otherwise harm the seal, said sealing means being adapted for repeated usage without damage or loss of efficiency.

Another object of the present invention is the provision of a closure means provided with a seal which is effected by the deflection of a flexible sealing element when in sealing engagement with a frusto-conical sealing surface, the stored energy within the deflected sealing element providing for the automatic adjustment thereof so as to always sealingly engage the sealing surface regardless of whether or not prefect roundness and/or angularity is present. A related object is the provision of a closure and seal device which may be of all-metal construction, not requiring conventional compressible gaskets or seals which are not effective under high temperature and/or pressure and/or corrosive conditions.

These and other objects of the present invention will become apparent from consideration of the present specification taken in conjunction with the accompanying drawings in which there are shown several embodiments of the invention by way of example, and wherein:

FIGURE 1 is a plan view of an exemplary embodiment of a closure means embodying the principles of the present invention;

FIGURE 2 is a sectional view taken along line 2—2 of FIGURE 1;

Figure 3:
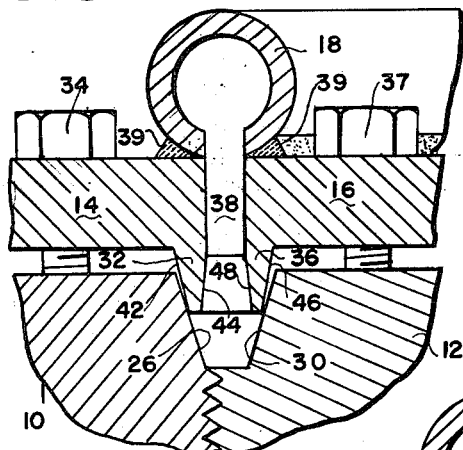
FIGURE 3 is an enlarged fragmentary sectional view of the embodiment illustrated in FIGURE 2.

Referring more particularly to the drawings, there is shown in FIGURES 1 through 4 a first embodiment of a closure means embodying the principles of the present invention. Generally speaking, the invention is concerned with closing and sealing an opening in a casing, such as, for example, the open end of a conduit or pipe, or the opening in a pressure vessel, or the like. Basically the embodiment comprises an open ended casing 10, plug means 12 disposed in the opening in casing 10, and inner and outer sealing members 16 and 14, respectively, joined together by a connecting member 18.

More specifically, casing 10, only the end of which is shown, is of circular cross-sectional configuration defining center bore or opening 20, and terminating in a flat end face 22. As can be seen, the end portion of bore or opening 20 is threaded, as at 24, and is formed at its outer terminal periphery to define a frusto-conical sealing surface 26. Securely positioned within opening 20 by means of threads 24, is the load-bearing means, which is plug means 12, provided with a flat outer surface 28 and peripheral frusto-conical sealing surface 30.

As will be appreciated, the existence of high pressure fluid within the casing 10 will subject the plug means 12 to a tremendous force equal to such pressure multipled by the area of the opening 20. Since it is intended that the plug means 12 withstand the greatest proportion of the force due to the pressure within the casing 10, it is important that it be tightly secured thereto. A threaded connection is particularly suited to this application, but the invention is not limited to the use of threads only, and contemplates the use of any appropriate means for securely but removably, holding plug means 12 in place. For example, if desired, a sturdily constructed bayonet type plug might be utilized. It is not important that the means so used provide an absolutely fluid tight seal between the plug means 12 and the casing 10, as there is provided additional sealing means to serve this function, to be described hereinafter.

In order to prevent the leakage of high pressure fluid in casing 10 between the plug means 12 and the casing, there is provided sealing means comprising outer and inner sealing members 14 and 16, respectively, joined by connecting member 18. As can be seen, outer sealing member 14 is formed as a flat annular ring, having an outside diameter substantially the same as that of the outside of casing 10. About the inner peripheral edge of sealing member 14, formed integrally therewith, there is provided a downwardly extending circumferential flexible sealing lip 32. Sealing member 14 is adapted to be tightly, but removably, secured to casing 10 by means of bolts 34, or the like.

The inner sealing member 16 is also annular in shape, and is provided about its outside periphery, integrally formed therewith, with a downwardly directed circumferential flexible sealing lip 36. In use, the inner sealing member 16 is securely, but removably, secured to plug means 12 by means of bolts 37, or any other suitable fastening devices. Of course, if desired, the inner sealing member 16 may be permanently welded to plug means 12. As will be more fully described hereinafter, the engagement of lips 32 and 36, with frustoconical sealing surfaces 26 and 30, respectively, prevents high pressure fluid from escaping between plug means 12 and casing 10, and then out between the inner sealing member 16 and the plug means, or the outer sealing member 14 and the casing. In order to prevent fluid from escaping through gap 38 between the outer and inner members 14 and 16, there is provided connecting member 18 which serves to permanently interconnect the two members in a fluid-tight connection, thus preventing the leakage of any fluid between them.

Connecting member 18 is formed from any flexible, but strong, material, as for example steel or the like, and, in the first embodiment, is in the form of a circularly bent tube securely welded, as at 39, to the outer and inner members 14 and 16, respectively, to provide a permanent leakproof seal therebetween. Connecting member 18 is provided with a circumferential slot 40 about the lower edge thereof, which slot is in communication and co-extenisve with gap 38. As will be appreciated, the flexible connecting member 18 may take the form of many different types of connectors, such as bellows, or conventional expansion joints. In the several other embodiments disclosed, there is illustrated an alternate structure which also serves as a flexible connector, as will be later described.

In order to more clearly illustrate the sealing action of lips 32 and 36, FIGURE 3 shows the closure means in an intermediate position, wherein the plug means 12 is fully engaged with the casing 10, but wherein the sealing means is only hand tight, not yet having been securely fastened in place. As can be seen, sealing lip 32, when in its relaxed position, is provided about its outer periphery with a frusto-conical sealing surface 42, having an angle of taper, with respect to the longitudinal axis of opening 20, normally les than the angle of taper of frusto-conical sealing surface 26, with respect to the same axis. Thus, lip 32, which may be formed of any suitable flexible material, such as, for example metal or the like, is adapted to be deflected inwardly by its engagement with frusto-conical sealing surface 26 when sealing member 14 is drawn tightly against casing 10 by means of bolts 34. In order to reduce the amount of material in lip 32, and so that it will have a flat inner periphery when in deflected position, it is provided with downwardly flared inner portion 44.

Similarly, sealing lip 36 is provided with frusto-conical sealing surface 46 having a normal angle of taper less than the angle of taper of the frusto-conical surface 30 on plug means 12. Also, formed about the outer peripheral face of lip 36 is downwardly and inwardly flared portion 48. As can be seen, the included angle between frusto-conical surfaces 42 and 46 is normally less than the included angle between frusto-conical surfaces 26 and 30. Thus, lip 36 is adapted to be deflected outwardly by the engagement of sealing surface 46 with sealing surface 30 when sealing member 16 is drawn tightly against the plug means 12 by means of bolts 37.

Thus, as can be visualized, when bolts 34 and 37 are brought up tight, sealing members 14 and 16 will be snugly held in place against casing 10 and plug means 12, respectively, with the entire area of surface 46 mating with surface 30, and the entire area of surface 42 mating with surface 26. The engagement of the lower surface of member 14 to end face 22 of casing 10 serves to limit the maximum deflection which sealing lip 32 is subject to. Similarly, the engagement of the lower surface of member 16 with the corresponding upper flat surface 28 of plug means 12 serves to prevent over-deflection of sealing lip 36. It is therefore possible to draw bolts 34 and 37 up as tight as possible without risking damaging the seal, either by deforming any of the frusto-conical sealing surfaces, or by overly deflecting either of the lips by creating stresses within them greater than their elastic limit. FIGURE 2 illustrates the closure means in complete sealing engagement, as will be apparent.

Figure 4:
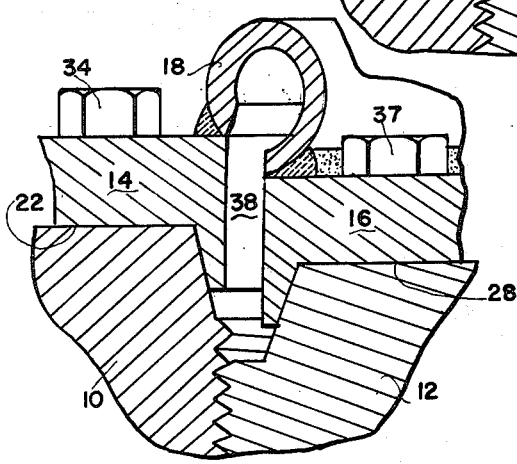
FIGURE 4 is an enlarged fragmentary sectional view of the closure means, showing it in a condition of misalignment.

As was discussed above, connecting member 18 is formed of a suitable flexible material, which material must have sufficient strength to resist the forces created by the high pressure fluid in gap 38. FIGURE 4, in an exaggerated view, illustrates why it is desirable that connecting member 18 be flexible. As can be seen, plug means 12 when tightly secured within opening 20, reached a snug position with its upper surface 28 disposed in plane spaced from the plane of the end surface 22 of the casing 10. In actual practice this will often occur as the likelihood of these two surfaces being co-planar is quite small, it being desirable to tighten plug means 12 until it is snugly secured. However, this misalignment does not in any way effect the seals, since connecting member 18 is adapted to deflect as shown to make up for the misalignment, the seals themselves being undisturbed. The relative movement between the two sealing members thereby made possible is important, not only to allow proper make-up when the faces of the plug means and casing do not fall in exactly the same plane, but also to allow for relative movement produced by the expansion of the casing and the bending of the sealing members under operating conditions. The present invention, therefore, serves to effectively seal the gap between the periphery of an opening in a casing and a plug disposed therein, regardless of the exact position of the plug.

Figure 5:
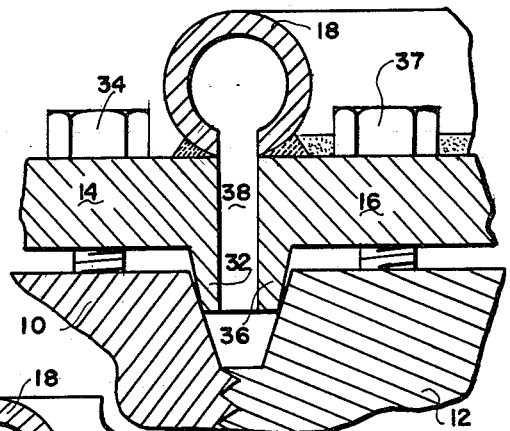
FIGURE 5 is an enlarged fragmentary sectional view of a second embodiment of a closure means embodying the principles of the instant invention.
Figure 6:
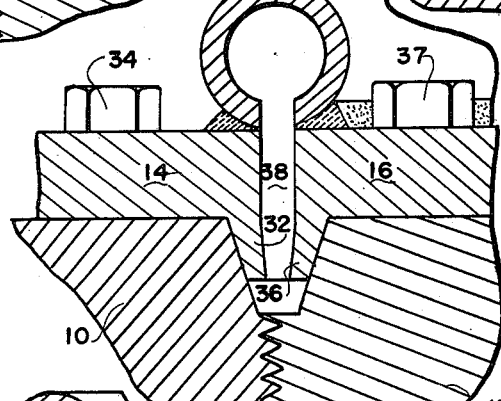
FIGURE 6 is an enlarged fragmentary sectional view of the embodiment shown in FIGURE 5, showing it in assembled condition.

In FIGURES 5 and 6 there is illustrated a second embodiment of the present invention. This embodiment is almost exactly the same as the first embodiment, except for the fact that the lips 32 and 36 thereof are not provided with flared surfaces, equivalent to those shown in FIGURE 3 at 44 and 48. Thus, when this embodiment is in a hand-tight position the gap 38 between the lips is defined by parallel, not flared, walls. When the outer and inner members 14 and 16 are tightly secured into sealing position, the deflection of lips 32 and 36 causes gap 38 to be narrower at its lower end than at its upper end. Functionally speaking, this embodiment is exactly the same as the first embodiment described, the only difference lying in this relatively minor design feature.

Figure 7:
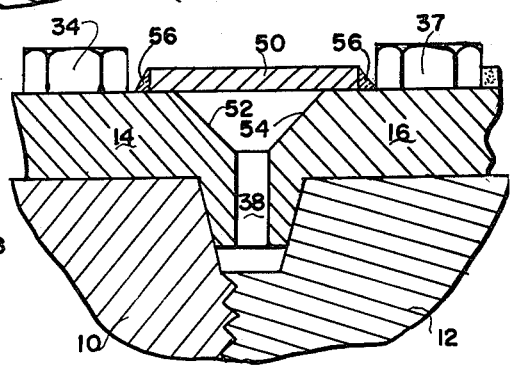
FIGURE 7 is an enlarged fragmentary sectional view of a third embodiment of a closure means designed according to the principles of the present invention.
Figure 8:
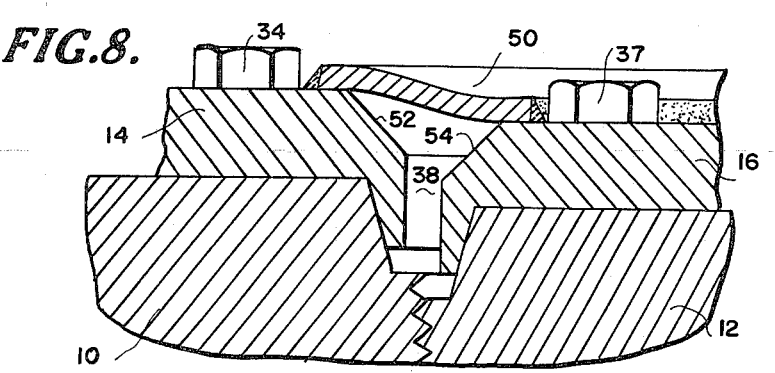
FIGURE 8 is an enlarged fragmentary sectional view of the embodiment shown in FIGURE 7, showing it in a condition of misalignment.

In a third embodiment, illustrated in FIGURES 7 and 8, the tubular connecting member 18 has been modified and in this embodiment is in the form of a flat annular connecting ring 50, formed of some suitable flexible material. The ring-like connecting member 50 functions in exactly the same manner as does tubular connecting member 18. In order to give it sufficient width to be capable of the necessary flexibility to withstand any misalignment of the plug means 12 and casing 10, there is provided on the adjacent peripheral edges of the outer and inner sealing members, chamfered portions 52 and 54, respectively, defining a V-shaped groove therebetween. The connecting member 50 may be connected to the inner and outer sealing members by any suitable means, such as, for example fluid-tight welds 56.

Upon misalignment of the outer surface of casing 10 and plug means 12, as discussed above, the resulting configuration of connecting member 50 is illustrated in FIGURE 8. Although the plug means 12 is shown to be positioned below the end of the casing 10, it very well could be disposed above it instead, the result being the same insofar as sealing the gap therebetween is concerned.

Figure 9:
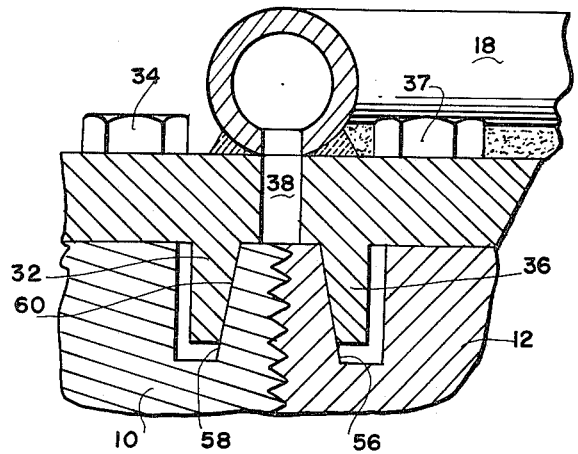
FIGURE 9 is an enlarged fragmentary sectional view of a fourth embodiment of a closure means embodying the principles of the present invention.

A fourth embodiment of the present invention is illustrated in FIGURE 9. In this embodiment the functional inter-relationship between the respective parts is essentially the same as that of the previous embodiments, however, in this embodiment the frusto-conical sealing surfaces formed on the plug means 12 and casing 10, indicated at 56 and 58, respectively, are spaced from the threaded joint therebetween. Accordingly, a frusto-conical sealing surface 60 is provided on the inner peripheral surface of lip 32, and a frusto-conical sealing surface 62 is provided on the outer periphery of lip 36. One advantage of this embodiment is that due to the fact that more of the outer surface of the plug means 12 is available for threads, it is thereby possible to shorten its length and yet provide sufficient threads. This embodiment seals in exactly the same manner as the previous embodiments, namely by the deflection of lips 32 and 36 caused by their engagement with sealing surfaces 58 and 56, respectively, when the sealing members are tightly secured in place, the bottom surfaces of the sealing members acting as protective stops or shoulders, as before. Although a tubular connecting member 18 is shown, it may be replaced, if desired, by a flat ring-like connecting member simply by widening out the upper portion of gap 38.

Figure 10:
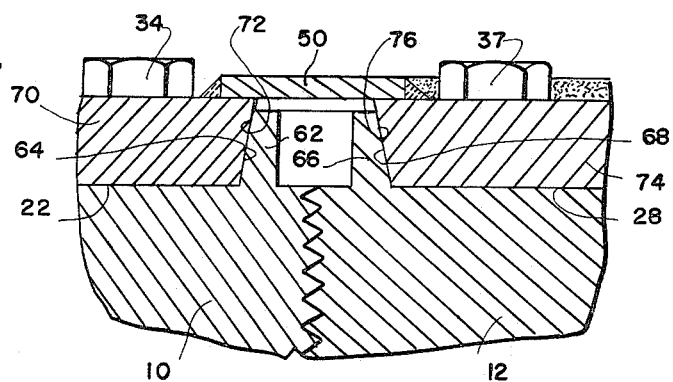
FIGURE 10 is an enlarged fragmentary sectional view of a fifth embodiment of the invention.

There is illustrated in FIGURE 10 a fifth embodiment of the present invention, wherein the sealing lips are formed integrally with the casing 10 and plug means 12, rather than with the outer and inner sealing rings. As can be seen, casing 10 is provided with a sealing lip 62 provided on its outer peripheral surface with frusto-conical sealing surface 64. Similarly, plug means 12, which may be shortened as in the preceding embodiment, is provided with sealing lip 66 provided on its inner peripheral face with frusto-conical sealing surface 68. The outer sealing member, indicated at 70, is provided about its inner periphery with frusto-concial sealing surface 72, and the inner sealing member, indicated at 74, is provided about its outer peripheral surface with a frusto-conical sealing surface 76.

In this embodiment, just as in those previously described, the seal is effected by tightly securing outer sealing member 70 tightly against casing 10 by means of bolts 34, and inner sealing member 74 tightly against plug means 12 by means of bolts 37. Sealing lip 62 is deflected inwardly to effect a seal and lip 66 is deflected outwardly to effect a seal, the abutment of the lower surfaces of the inner and outer sealing members upon the upper surfaces of the plug means and casing, respectively, preventing over-deflection of the lips 62 and 66. In this embodiment the connecting member is shown in the form of annular ring 50, as above, but, if desired, a tubular connecting member 18 may be utilized instead.

In all the embodiments disclosed herein, the internal energy in the sealing lips, caused by their deflection, serves to maintain them in sealing engagement with the corresponding opposed sealing surfaces. However, in the embodiments illustrated in FIGURES 1 through 8 and 10, there is an additional medium acting to force the sealing lips into a sealing engagement, namely the force caused by the pressure in gap 38 against the exposed sides of the sealing lips. In the embodiment shown in FIGURE 9 the pressure against gap 38 does not serve to so urge the sealing lips, however, the counteracting forces in the casing 10 and plug means 12 which oppose the forces caused by the deflection of lips 32 and 36, respectively, tend to urge the upper threads of the casing and plug means into tighter engagement, thus providing additional sealing action.

Because of the manner in which embodiments of the present invention may be constructed, and because of the nature of the seals utilized therein, the entire structure may be manufactured from metal alloys, or other suitable metallic substances. This is extremely advantageous in critical applications where stainless or other high alloy steels must be used in order to withstand the existing temperature conditions and to be able to resist corrosion effects when utilized either in a corrosive atmosphere or with corrosive fluids. Since the entire construction may be fabricated from metal, including the respective sealing elements, there is no need for the use of such materials as rubber and/or other gasket materials which are not dependable under critical conditions, which require regular maintenance, and which are subject to corrosion.

Thus, there is disclosed in the above description, and in the drawings, several exemplary embodiments of my invention which fully and effectively accomplish the objects of the invention. Each embodiment comprises a load-bearing plug means removably disposed within a casing opening to be sealed, and a removable sealing means for effectively sealing the gap between the plug means and casing. The plug means and casing, together, provide a first pair of frusto-conical sealing surfaces, and the removable sealing means provides a second pair of frusto-conical sealing surfaces, one of said pairs of sealing surfaces being disposed on the peripheral faces of a pair of flexible sealing lips. In each of the embodiments, the included angle between the sealing surfaces of said lips, constituting one of said pairs of sealing surfaces, is normally less than the included angle between the sealing surfaces constituting the other pair. Thus, an effective seal is achieved by the engagement of the first pair of sealing surfaces with the second pair of sealing surfaces, wherein the deflection of said sealing lips caused by their engagement creates in said lips internal forces tending to maintain them in sealing engagement with said other pair of said sealing surfaces. The pair of frusto-conical seals thus effected, serve to prevent leakage of high pressure fluid between said casing and said load-bearing plug means.

However, it will be understood by those skilled in the art that the specific details of construction and arrangement of parts, as described, are by way of example only and are not to be construed as limiting the scope of the invention. I, therefore, do not wish to be limited to the precise details set forth, and intend that the invention embody all such features and modifications as are within the scope of the appended claims.

Having thus described my invention, what I claim as new and desire to secure by Letters Patent is:

1. Closure means for sealing an opening in a pressure vessel casing comprising:
    (a) load bearing plug means engageable in said opening in tightly secured relation, the outer surface of said plug means having an axially extending frusto-conical sealing surface, and an axially extending frusto-conical sealing surface on said casing around said opening in cooperative alignment with the sealing surface of said plug means, defining with said plug means sealing surface a first pair of concentric sealing surfaces, the planes of said first pair of frusto-conical sealing surfaces intersecting one another;
    (b) sealing means constructed and arranged to be joined to the open end of said pressure vessel and the outer surface of said plug means in bridging relationship to the joint between said plug means and said pressure vessel, said sealing means including a second pair of concentric frustro-conical sealing surfaces extending axially inwardly in cooperative relationship with said first pair of outwardly extending concentric sealing surfaces and aligned therewith for sealingly engaging the latter for preventing fluid leakage between said plug means and said pressure vessel casing;
    (c) and a pair of resilient, concentrically spaced apart deflectable lips of hard metal or the like carrying one of said pairs of sealing surfaces, the included angle of the sealing surfaces on said lips being normally less than the included angle of the other pair of sealing surfaces, said lips being operative for transverse deflection to engage their sealing surface into mating stressed sealing engagement with the other pair of sealing surfaces, the internal energy in said lips creating a fluid seal between said sealing surfaces to thereby seal the joint between said plug means and said pressure vessel.

2. Closure means as claimed in claim 1, wherein said sealing means is provided with shoulder means for positively engaging said casing to limit the maximum amount of deflection, and hence stress, to which said resilient lips will be subjected when said sealing means is tightly secured to said plug means and casing.

3. Closure means as claimed in claim 1, wherein said sealing means comprises: an inner member for securement to said plug means and provided with one of said frusto-conical sealing surfaces of said second pair; an outer member for securement to said casing and provided with the other said frusto-conical sealing surface of said second pair; connecting means joined to said inner and outer members for forming a leakproof connection between said inner and outer members; and means for securing said inner and outer members to said plug means and casing, respectively, when said plug means is disposed in said opening.

4. Closure means as claimed in claim 3, wherein said inner member is secured to said plug means at points located within the area defined by the frusto-conical sealing surface on said inner member, and wherein said outer member is secured to said casing at points located outside the area defined by the frusto-conical sealing surface on said outer member.

5. Closure means as claimed in claim 4, wherein said connecting means is connected to said inner member along a line located outside the area defined by the points where said inner member is secured to said plug means, and wherein said connecting means is connected to said outer member along a line located within the area defined by the points where said outer member is secured to said casing.

6. Closure means as claimed in claim 3, wherein said connecting means is formed of flexible material so that the inner and outer members may be slightly displaced with respect to each other and yet effectively maintain a leakproof seal around said joint.

7. Closure means as claimed in claim 6, wherein said connecting means comprises a circularly bent tube disposed between said inner and outer members and tightly secured to each of them, said tube having formed therein a circumferential slot through one wall thereof substantially in alignment with said joint.

8. Closure means as claimed in claim 3, wherein said connecting means comprises a substantially flat flexible annular ring, the inner periphery of said ring being tightly secured to said inner member and the outer periphery of said ring being tightly secured to said outer member.

9. Closure means defined in claim 1 wherein said deflectable lips are carried by said sealing means.

10. Closure means defined in claim 1 wherein said deflectable lips are carried by said pressure vessel and said plug means, respectively.

11. Closure means for sealing an opening in a pressure vessel casing comprising:
    (a) a first frustro-conical sealing surface in said casing at the open end thereof;
    (b) load bearing plug means for engagement in said opening in tightly secured relation, the outer surface of said plug means including a second frusto-conical sealing surface concentric with said casing sealing surface, the planes of said frusto-conical sealing surfaces intersecting one another;
    (c) and sealing means constructed and arranged to be joined to the open end of said pressure vessel and the outer surface of said plug means in bridging relationship to the joint between said plug means and said pressure vessel, said sealing means including a pair of spaced apart deflectable sealing lips of hard metal or the like extending axially inwardly in cooperative relationship with said casing and plug means sealing surfaces, and operatively aligned therewith, said sealing lips each having a frusto-conical sealing surface with an included angle normally less than the included angle of the sealing surface operatively adjacent thereto, said lips being operative for transverse deflection into mating stressed sealing engagement with the adjacent sealing surfaces to provide a fluid seal for the joint between said plug means and said pressure vessel.

12. Closure means as claimed in claim 11, wherein said sealing means comprises: an inner member for securement to said plug means; an outer member for securement to said casing, one of said lips forming a part of said inner member and the other of said lips forming a part of said outer member; means forming a leakproof connection between said inner and outer members; and means for mounting said inner and outer members to said plug means and casing, respectively, when said plug means is disposed in said opening.

13. Closure means as claimed in claim 12, wherein said inner and outer members are provided with shoulders for positively engaging said plug means and casing, respectively, to limit the maximum amount of transverse deflection to which said lips will be subjected.

14. Closure means defined in claim 11 wherein said pressure vessel frustro-conical sealing surface is formed in the opening thereof in facing relationship to said plug means sealing surface, the sealing surface on said deflectable lips thereby facing opposite to one another.

15. Closure means defined in claim 11 wherein said pressure vessel sealing surface is spaced outwardly from the opening thereof in oppositely facing relationship to said plug means sealing surface, said plug means sealing surface being spaced inwardly of the portion thereof engaging said pressure vessel, the sealing surface on said deflectable lips thereby facing one another.

References Cited in the file of this patent

UNITED STATES PATENTS

| | | |
|---|---|---|
| 1,184,198 | Morison | May 23, 1916 |
| 1,873,855 | Wilson | Aug. 23, 1932 |
| 1,902,494 | Emmet | Mar. 21, 1933 |
| 1,958,582 | Kerr et al. | May 15, 1934 |
| 2,062,589 | Lucas | Dec. 1, 1936 |
| 2,226,495 | Jacocks | Dec. 24, 1940 |
| 2,232,936 | Bimpson | Feb. 25, 1941 |
| 2,424,449 | Gasche | July 22, 1947 |
| 2,617,554 | Smith | Nov. 11, 1952 |
| 2,670,185 | Schorner et al. | Feb. 23, 1954 |
| 2,746,486 | Gratzmuller | May 22, 1956 |
| 2,821,325 | Chapellier et al. | Jan. 28, 1958 |
| 2,989,209 | Hersman | June 20, 1961 |

FOREIGN PATENTS

| | | |
|---|---|---|
| 493,575 | Great Britain | Oct. 11, 1938 |
| 963,387 | France | Dec. 26, 1949 |